United States Patent [19]

Möbius

[11] Patent Number: 4,848,629
[45] Date of Patent: Jul. 18, 1989

[54] CARRIER ARRANGEMENT

[76] Inventor: Ulrich N. Möbius, Fraunhoferstrasse 45, 6450 Hanau/Main, Fed. Rep. of Germany

[21] Appl. No.: 129,657

[22] Filed: Dec. 7, 1987

Related U.S. Application Data

[63] Continuation of Ser. No. 841,529, filed as PCT EP85/00308 on Jun. 27, 1985, published as WO 86/00267 on Jun. 16, 1986, abandoned.

[30] Foreign Application Priority Data

Jun. 27, 1984 [DE] Fed. Rep. of Germany .... 84 19222.4

[51] Int. Cl.$^4$ ............................................. B60R 9/04
[52] U.S. Cl. ..................................... 224/315; 224/309
[58] Field of Search ............... 224/309, 315, 319, 322, 224/324, 325, 326, 329, 917; 211/4, 70.5, 162; 40/609, 611, 618, 124, 649, 652, 657; 24/616, 617, 639; 296/37.1, 37.7; 248/297.2, 500, 503, 503.1; 410/104, 105, 150, 101, 106, 108, 110, 116, 8–12, 23; 221/307, 310; 453/50, 51, 52; 194/344, 351

[56] References Cited

U.S. PATENT DOCUMENTS

| | | | |
|---|---|---|---|
| 3,836,058 | 9/1974 | Penniman et al. | 224/329 |
| 4,383,627 | 5/1983 | Ingram | 224/315 |
| 4,473,178 | 9/1984 | Bott | 224/326 |
| 4,688,843 | 8/1987 | Hall | 410/8 |

FOREIGN PATENT DOCUMENTS

| | | | |
|---|---|---|---|
| 204238 | 7/1956 | Australia | 410/105 |
| 8419222 | 2/1985 | Fed. Rep. of Germany . | |

Primary Examiner—Henry J. Recla
Assistant Examiner—J. Casimer Jacyna
Attorney, Agent, or Firm—Jordan B. Bierman

[57] ABSTRACT

Carrier device for receiving burdens to be placed on the roof of a motor vehicle with carrier elements (10) spaced from each other. The carrier elements include C profile rails (22) nested in the longitudinal direction wherein maybe releasibly secured attachment elements such as ski carriers. To facilitate the mounting thereof, at least one end (24) of the C profile rails (22) is provided with a ramp-like push buttong (30) and lockable by means of a bolt actuatable by a lock mechanism.

11 Claims, 3 Drawing Sheets

CARRIER ARRANGEMENT

This application is a continuation of U.S. patent application Ser. No. 841,529 filed as PCT EP85/00308 on Jun. 27, 1985, Published as WO86/00267 on Jan. 16, 1986, now abandoned.

The invention relates to a carrier arrangement for the accommodating of goods to be carried on the roof of a motor vehicle, with carrying members preferably being arranged on the vehicle roof transversely and at a distance to each other, said carrying members having profile tracks for the accommodating of holding elements such as ski holders.

A corresponding carrier arrangement can be concluded for example from European Patent Application No. 82103893. Here each carrying element is supported on the vehicle roof by means of rubber elements present in the front and lateral areas, whereby the loads are transferred to the robust lateral areas of the vehicle roof. The carrying elements themselves can be secured either to the vehicle rails, vehicle roof gutters or for example securing blocks set releasibly in the roof. Profile tracks are set longitudinally in each carrying member in which holding elements of for example luggage racks, bicycle holders, case boxes, surfboard holders or ski holders can be fastened.

Other familiar carrying arrangements set at a distance to the vehicle roof also have profile tracks in which holders can be inserted specifically for the loads to be carried. In order to ensure that the holders cannot come out of the profile tracks in an uncontrolled manner it is necessary to lock both end areas of each profile track, preferably by means of locks. As such action, ie. the use of keys in the roof area of a vehicle, is laborious, it can be seen over and over again that corresponding tracks are not locked. Moreover during cold weather one sees locks iced up.

The object of the present invention is to develop a carrying arrangement of the type described above, in particular a carrying arrangement such as can be concluded from European Patent Application No. 82103893, so that holding elements can be easily inserted into the profile tracks without locking elements necessarily in conjunction with keys being imperative, and at the same time there should be the advantage of a safeguard against theft.

According to the invention the object is solved in that at least one extension for the insertion of fastening elements or respectively one free end of each profile track can be locked via a push button. Preferably only one free end of the profile track can be locked with the push button, whereas the other free end of the profile track is closed by the carrying element itself. Consequently only the push button has to be pushed in order to push the holding elements into the profile tracks or to remove them from them. The former takes place by placing the holding element with the section to be inserted into the profile track onto the push button and moving said holding element in the direction of the profile track, whereby the push button—if unlocked—is moved, pushed towards the vehicle roof and thereby frees the profile track. Thereby the locking element itself should be guided preferably by sections of side walls which border the profile track laterally. This results in a closed surface and an engaging exterior. This is particularly advantageous in the case of a construction in which the carrying arrangement comprises a plate-shaped base element, as can be concluded from European Patent Application No. 82103893.

In order to provide the push button with a safeguard against theft, according to a further embodiment a locking element can pierce the push button, thus preventing the button from being depressed. To this effect a lateral part of the push button can for example interact with the locking element so that the push button can only then be depressed when the elements are not touching each other. The locking element is preferably a pin which pierces at least one side wall of the push button and which by choice either interacts with the push button or not via a lock mechanism. The pin can be spring pre-stressed normally so that it withdraws from the push button when the locking mechanism is in the so-called open position, so that the push button can be activated. To this effect and according to an own-invention proposal, not only in connection with the carrier arrangement, but which can also be used for example with bags, cases, toys, furniture, exterior window blinds and similar objects, ie. with all objects which should be locked, the in or a similarly functioning element is developed in such a way that it has at least one lateral protrusion or respectively a protrusion emanating from that pin which coordinates with a recess of an adjustable turning element of the lock mechanism, adjustable around turning axle running parallel to the pin longitudinal axis. If the protrusion and recess are aligned with one another in such a way that the former can pass into the latter, the pin is pushed away from the push button due to the spring surrounding the pin, so that the said push button is free. Preferably the pin, axially displaceable and not radially turnable, has two protrusions for example aligned diametrically to each other, to which is allocated in each case one turning element having the recess matching the corresponding protrusion. The turning element itself has preferably notches which interact with a notch spring. Thereby when adjusting the notch element only the coordination of the notch spring with the notches can be noted—by sound and feel—, without it being ascertainable whether the protrusion emanating from the pin is interacting with the recess on the turning element or not. This is a higher safeguard against theft.

In order to arrive at the correct allocation between turning elements and the protrusions of the pins the former can be provided with symbols such as numbers visibly on the outside.

The push button itself can preferably be swung around an axle running perpendicularly to the profile track, the axle for its part preferably running in the area facing away from the profile track. Of course the push button can also be spring pre-stressed in the direction of its movement direction, for example by a screw spring.

The push button itself can be a hollow body open towards the vehicle roof with a ramp-shaped visible surface with front and lateral areas emanating from it, whose sheared edges run parallel or in the main parallel to each other. When swinging around the axis running perpendicularly to the longitudinal axis of the profile track the ramp-shaped upper surface ensures that the foot parts of the holding elements can be pushed into profile tracks or removed from them almost without any resistance.

Through the teaching according to the invention an easily workable, theft-preventative, always operable solution is offered.

Further details, advantages and characteristics of the invention can be drawn not only from the claims but also from the preferred embodiments shown in the drawing.

Figure 1:
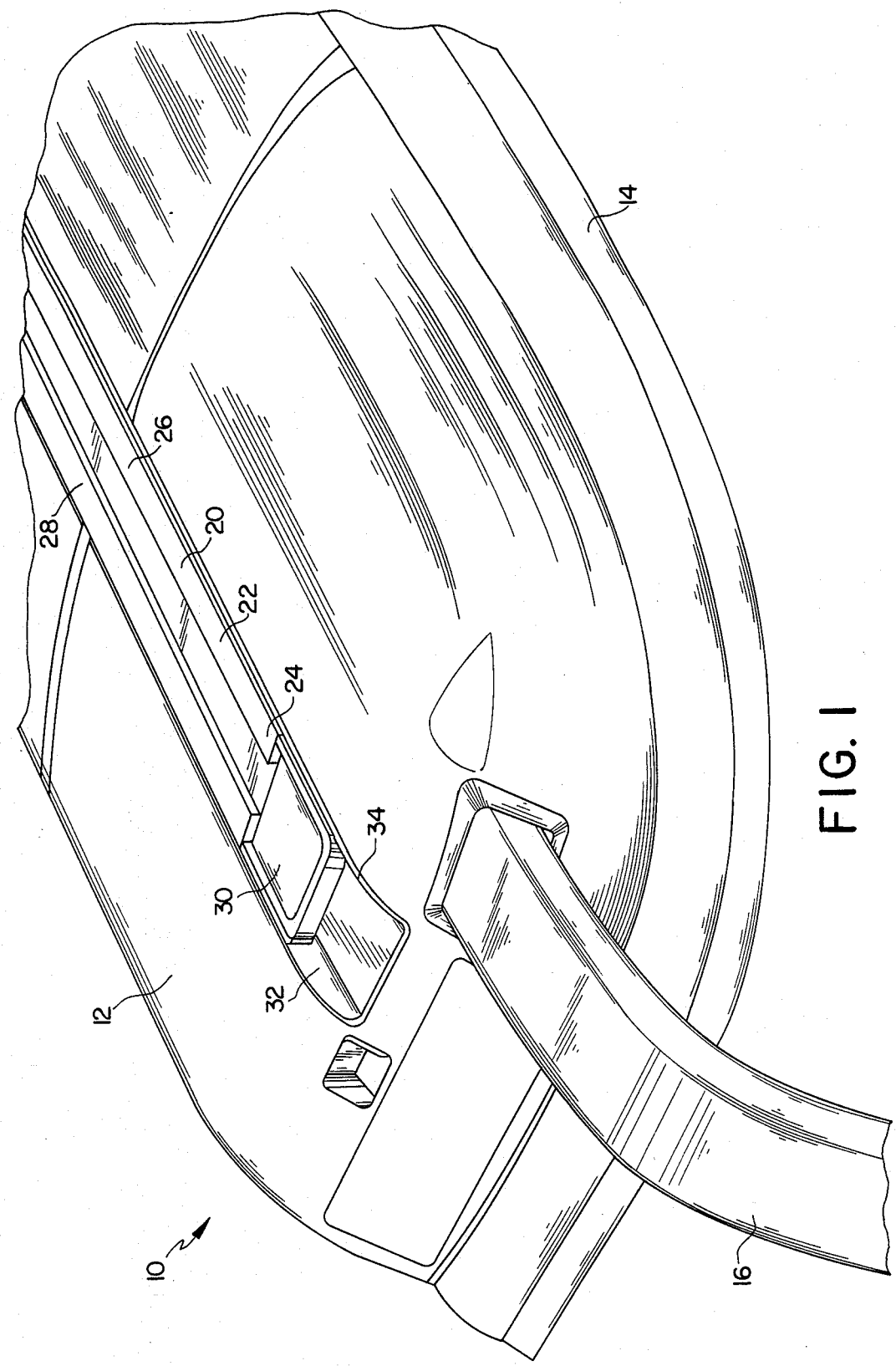
FIG. 1 shows: a perspective part representation of a carrying arrangement according to the invention.
Figure 2:
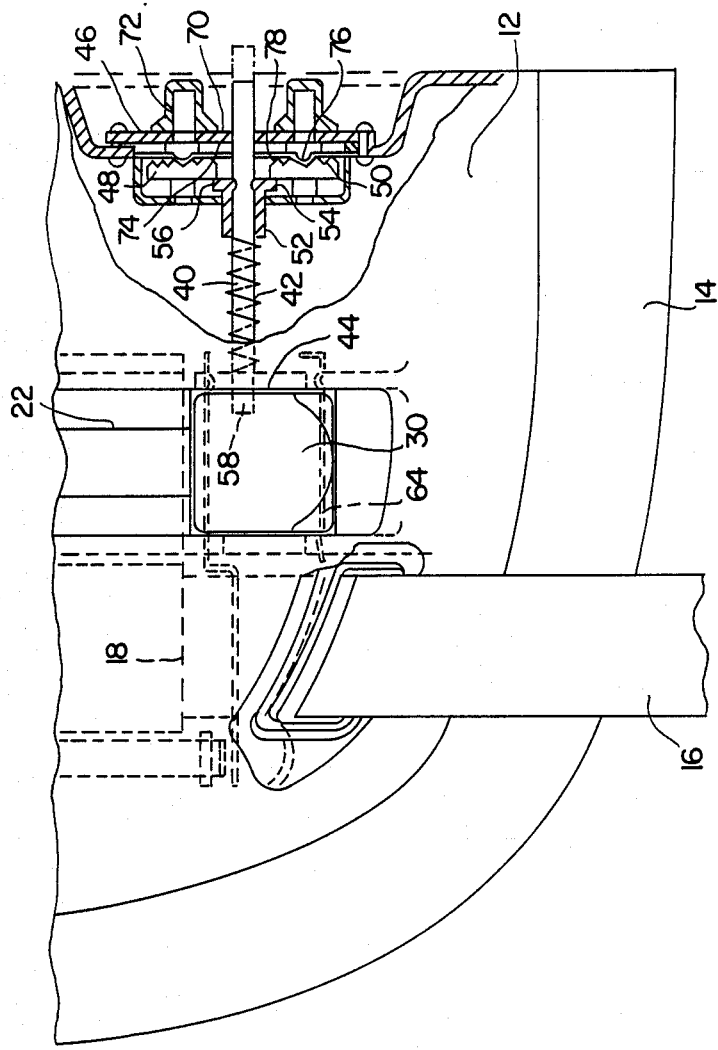
FIG. 2 shows: a top view of a section of a carrying arrangement with push button

FIG. 1 shows a perspective representation of a carrier 10 of a roof carrying arrangement, said carrier conforming in its main characteristics to the teaching of European Patent Application No. 82103893.2. Each carrying element consists therefore of a shell-shaped base element adaptable to the car body, with shock and sway absorbing elements such as rubber strips 14 present in the front and lateral areas which lie directly on the vehicle roof. The carrying element 10 is connected for example to the vehicle rails or roof gutters via adjustable holding elements 16 in order to distribute the load over the robust side areas of the vehicle roof. The holding elements 14 are thereby guided at least sectionally by guiding elements and square tubes running within the base element 12, as FIG. 2 shows under the reference number 12.

A profile track 22 with a slit 20 is let into the plate-shaped base element 12 in its longitudinal direction. The end area not shown is received by the base element 12 so that the profile track 22 cannot be reached from that side. The visible other free end 24 of the C profile track 22, which generally can be termed as a U-shaped profile material with the free ends of the limbs 26 and 28 facing each other, can be closed with a push button 30 which is guided by side walls 32 and 34 drawn into the base element, said side walls receiving for their part the profile track 22.

The push button is held in its raised position closing the profile track 22 from the front side by means of a spring element. If power is exerted on the push button in the direction of the vehicle roof, the profile track 22 is released to such an extent that foot pieces of holders such as surfboard holders, ski holders or the like can be inserted into them.

Figure 3:
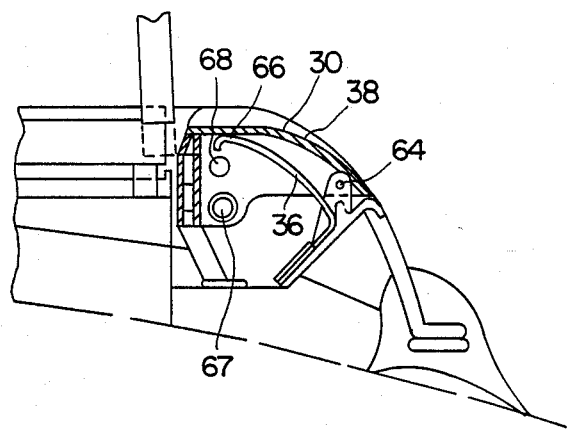
FIG. 3 shows: a detailed representation of the push button according to FIG. 2

As the drawing in FIG. 3 particularly shows, the upper surface 38 of the push button 30 is shaped like a ramp in order to enable, when push button is depressed, that the foot pieces of the holders can be slid towards the profile track 22 without practically any resistance. The same applies to removing the holders from the profile track 22.

In a further embodiment of the invention the push button 30 can be held in the raised position by a locking element 40 in order to ensure that the holding elements inserted into the profile track 22 cannot be removed from it in an uncontrolled way. In principle the form of the locking element can be of any choice, however in a preferred embodiment form a pin 40 surrounded by a spring 42 is chosen, the pin piercing at least one side wall 44 of the locking element. The pin 40 cooperates with a lock mechanism 46, which ensures that the pin passes through the wall 44 of the push button 30 principally against the spring power in order to lock the push button. In order to release the lock, ie. due to the power produced by the spring to release the pin 40 from the push button 30, turning elements 48 and 50 of the lock mechanism 46 have to be aligned onto protrusions 54 or 56 protruding laterally from the pin 40 or from a sleeve 52 surrounding the said pin so that the latter passes through the former. To this effect the turning element 48 and 50 have apertures which are not shown, matching the protrusions 54 and 56, said apertures being passed through by the protrusions 54 and 56 with correct alignment. In this case the pin 40 can pass through the turning elements 48 and 50 due to the spring power, so that the front end 58 of the pin 40 no longer passes through the wall 44 of the push button 30. Consequently the push button 30 can be moved towards the vehicle roof, allowing access to the profile track 22. The reference number 67 in FIG. 3 indicates the aperture with which the pin 40 or its front section 58 interacts with the push button 30 when the latter is closed. The end section 58 can then grip into the aperture 68 when the push button 30 should be kept depressed, in order to insert holding elements into the profile track 22 or to remove them from it.

Figure 4:
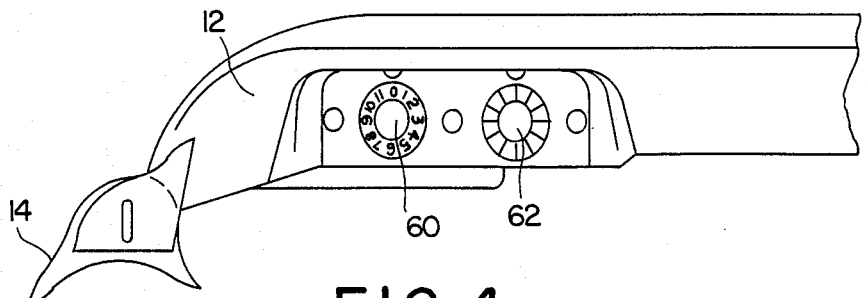
FIG. 4 shows: rear view of the carrying arrangement according to FIG. 2.

As the representation in FIG. 4 clarifies, the turning elements 48 and 50 can be set from the exterior visibly via setting discs 60, 62 in the form of a symbol or respectively number lock, in order to render the pin freely movable with the right combination. If the pin is to lock the push button 30 again, with the correct number combination set, the pin 40 has to be pushed inwards against the spring power 42 in order to then turn the setting discs at the point interacting with the push button 30. This achieves the aim that the protrusions 54, 56 can no longer simultaneously pass through the apertures (not shown) in the turning elements 48 and 50. It should be added that the turning elements 48 and 50 can have notches 74, 78 which cooperate with protrusions 72, 76 of a lock spring. There results thereby a locking interaction between the notches 74, 78 and the protrusions 72, 76 when one or both turning elements 48, 50 are turned, thus making it unrecognisable, either by sound or feel, when the locking element 40 is set correctly. This is consequently a higher safeguard against theft.

It should also be noted that the turning elements 48 and 50 are positioned self-faced, thus almost excluding the possibility of freezing up and therefore of not being able to turn.

Setting of the number discs 60 and 62 can be done individually. For this they are arranged loosely in order to be set at the markings arranged through arrows in FIG. 4 with the position freeing the pin 40. The position freeing the pin 40 is moreover visible on the rear side of the casing containing the holding elements 48, 50, said casing itself being preferably ultra sonically welded and therefore protected against dampness.

In accordance with the detailed representation according to FIGS. 2 and 3 the push button 30 can be swivelled preferably around an axle 64 running perpendicularly to the profile longitudinal axis, said axle 64 being arranged in the area of the push button 30 facing away from the profile track 24. It can also be seen that the spring element 36 is preferably a bent leaf spring which interacts with an upper end section 66 with the upper inner surface of the push button 30. Of course the push button can also be arranged in a freely movable manner in a recess present in the base element 12 and can be arranged in a displaceable manner for example against a screw spring perpendicular to the top surface of the vehicle roof.

According to FIG. 1 the push button 30 is integrated in the base element in such a way as to produce a pleasing exterior but so that no resistance occurs aerodynamically either. FIGS. 2 and 4 also show that the lock mechanism 46 is arranged on the base element away from the air flow, so that soiling due to wind during driving does not occur. The lock mechanism 46 is preferably set into a recess on the rear sid of the base element 12 in order to offer further protection.

I claim:

1. A luggage carrier for mounting on the roof of a motor vehicle comprising;
   at least two elongated carrying members adapted to be spaced from one another and extend transversally to a car roof;
   a plurality of removable mounting elements;
   said carrying members including elongated tracks extending substantially the length thereof and having a C-profile cross section, said mounting elements being complimentarily shaped to said C-profile tracks such that they are slidably received and retained in said elongated tracks;
   a push button member attached to each carrying member adjacent one end of each track and having a spring element disposed beneath the push button biasing the push button in a raised position, said push button in its raised position having a cross section complimentary to the cross section of the C profile track such that said one end is blocked prohibiting the removal of the mounting elements in said track whereby, when said push button is held in its lowered position the cross section of the C profile track is revealed allowing the insertion of said mounting elements into said track.

2. Carrier according to claim 1 characterised in that one free end (24) of the profile track (22) is closed with the push button (30) and the other end of the profile track is closed solely by the carrying element (12).

3. Carrier according to claim 1 characterized in that the push button (30) can be swivelled around a carrier member axle (64) running perpendicularly to the profile track (22).

4. Carrier according to claim 1 characterised in that the push button (30) is guided in sections of side walls (32, 34) which border the profile track (22) laterally.

5. Carrier according to claim 1 characterised in that the push button is a hollow body open towards the vehicle roof with a visible, ramp-shaped, upper surface (38) with front and lateral surfaces emanating from said upper surface, whose sheared edges run parallel to each other.

6. Carrier according to claim 1 characterised in that a locking element (40) penetrates the push button (30) preventing it from being depressed.

7. Carrier according to claim 6 characterised in that the locking element (40) passes through at least one wall (44) of the push button (30).

8. Carrier according to claim 6 characterized in that the locking element is a spring pre-stressed pin (40) which can be moved out of the position locking the push button (30) by a lock mechanism (46).

9. Carrier according to claim 8 characterised in that two protrusions (54,56) emanate directly or indirectly from the axially displaceable, radially unturnable pin, to which is allocated a recess for each protrusion set into a turning element (48,50).

10. Carrier according to claim 8 characterised in that at least one lateral protrusion (54, 56) emanates directly or indirectly from the pin, which is allocated to a recess of an adjustable turning element (48, 50) around a locking element turning axle running parallel to the longitudinal axis of the pin.

11. Carrier according to claim 8 characterised in that the lock mechanism (46) is arranged on the carrying element (12) on the side away from the air flow when the car is in motion.

* * * * *